United States Patent [19]

Sogabe et al.

[11] Patent Number: 4,882,528
[45] Date of Patent: Nov. 21, 1989

[54] DIGITAL SERVO SYSTEM

[75] Inventors: Masatoyo Sogabe, Hachioji; Kanemasa Okuda, Hino; Keiji Sakamoto, Hachioji; Shunsuke Matsubara, Tokyo, all of Japan

[73] Assignee: Fanuc Ltd., Yamanashi, Japan

[21] Appl. No.: 233,644

[22] PCT Filed: Nov. 6, 1987

[86] PCT No.: PCT/JP87/00860
 § 371 Date: Jul. 8, 1988
 § 102(e) Date: Jul. 8, 1988

[87] PCT Pub. No.: WO88/03677
 PCT Pub. Date: May 19, 1988

[30] Foreign Application Priority Data

Nov. 8, 1986 [JP] Japan .................. 61-264881

[51] Int. Cl.$^4$ .............................. G05B 19/29
[52] U.S. Cl. .................. 318/600; 318/568.1; 318/574; 364/167.01
[58] Field of Search ............ 318/600, 568, 574, 625; 364/167

[56] References Cited

U.S. PATENT DOCUMENTS 4,701,839 10/1987 McNally et al. .................. 364/167
4,712,052 12/1987 Omae et al. ...................... 318/625
4,772,831 9/1988 Casler et al. ..................... 318/568

FOREIGN PATENT DOCUMENTS 139010 5/1985 European Pat. Off. .

Primary Examiner—William M. Shoop, Jr.
Assistant Examiner—Saul M. Bergmann
Attorney, Agent, or Firm—Armstrong, Nikaido, Marmelstein, Kubovcik & Murray

[57] ABSTRACT

A digital servor system can swiftly stop a moving object, having a small friction resistance to the motion, at the position where the object should stop, without vibration thereof. A velocity command generating device (3) calculates a velocity command ($V_{cmd}$) based on the deviation value of a position fedback from a position command detected by a position deviation detecting device (2). A velocity deviation detecting device (5) calculates a deviation (E) of a velocity fedback from the velocity command ($V_{cmd}$). A torque command generating device (6) calculates a torque command ($T_{cmd}$) giving a delay processing to the deviation (E), and outputs the torque command ($T_{cmd}$) to a motor driving means (7).

2 Claims, 4 Drawing Sheets

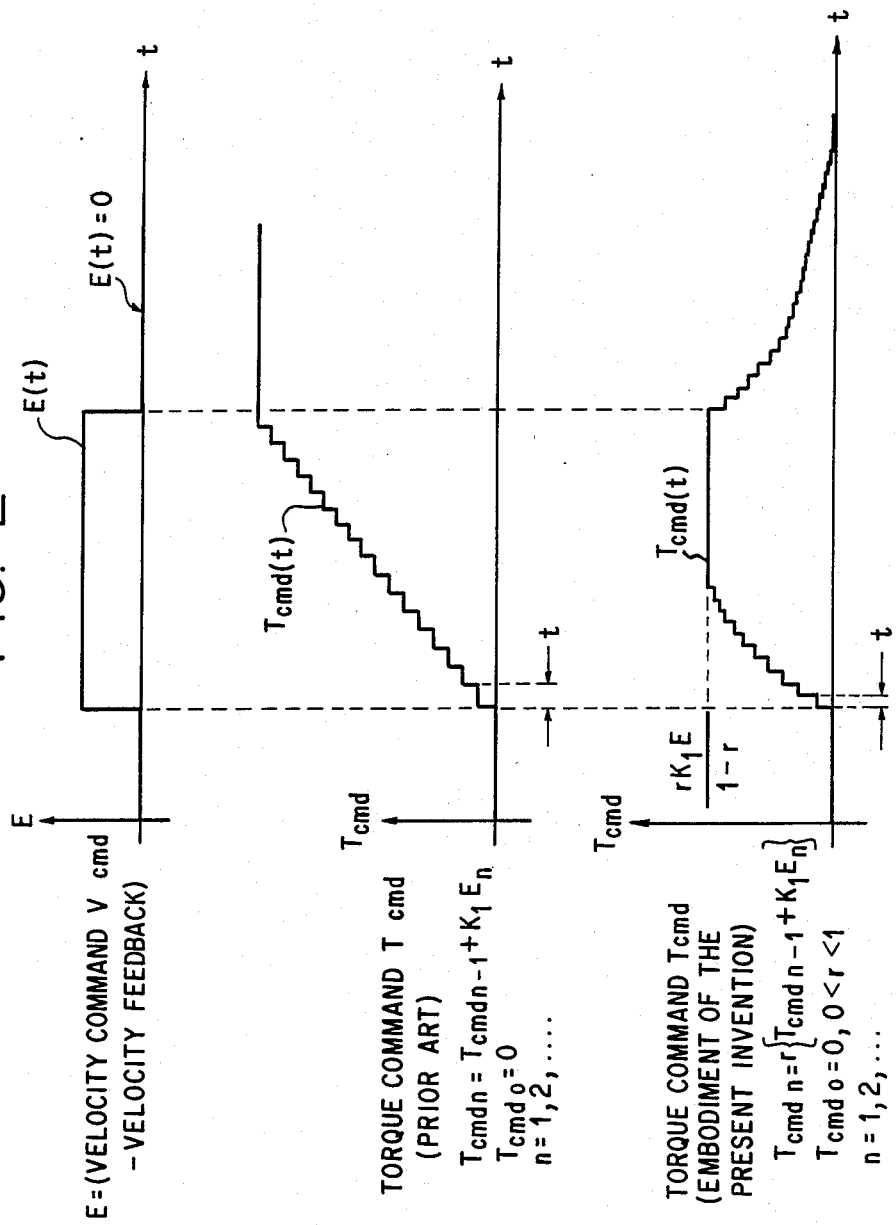

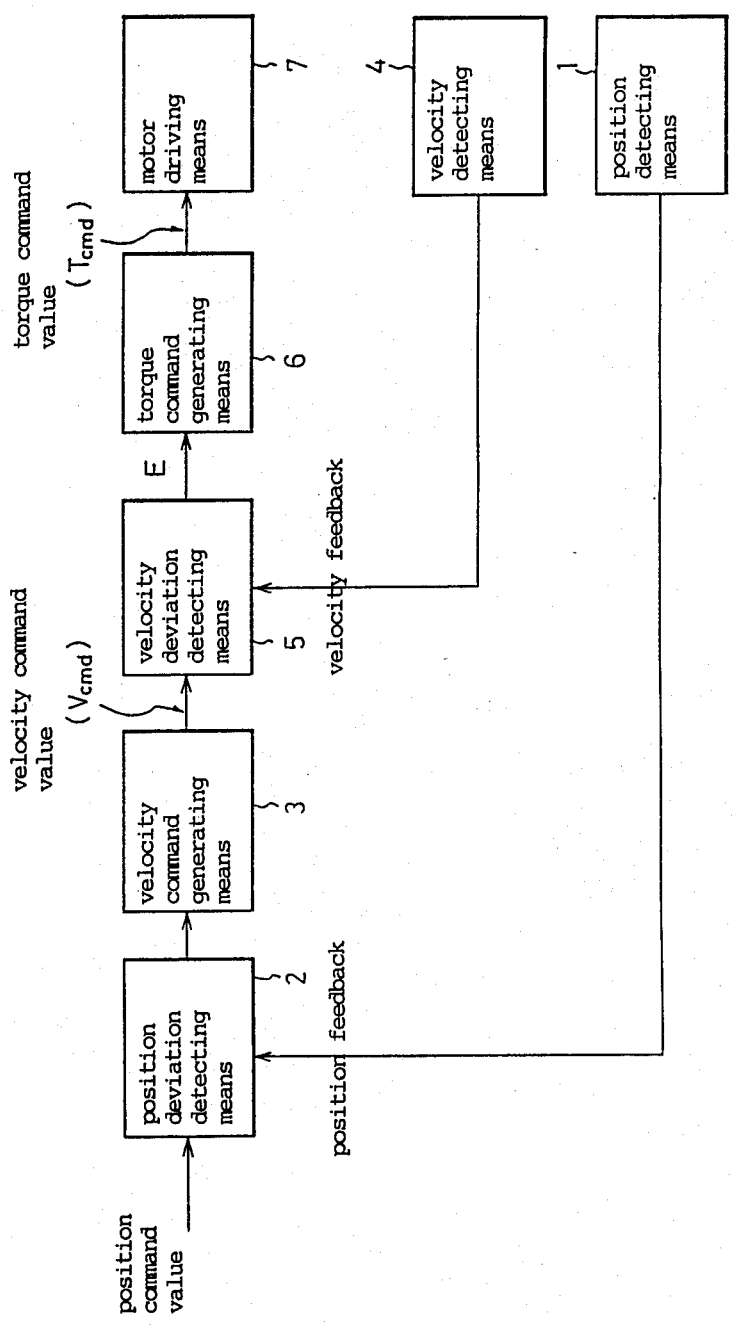

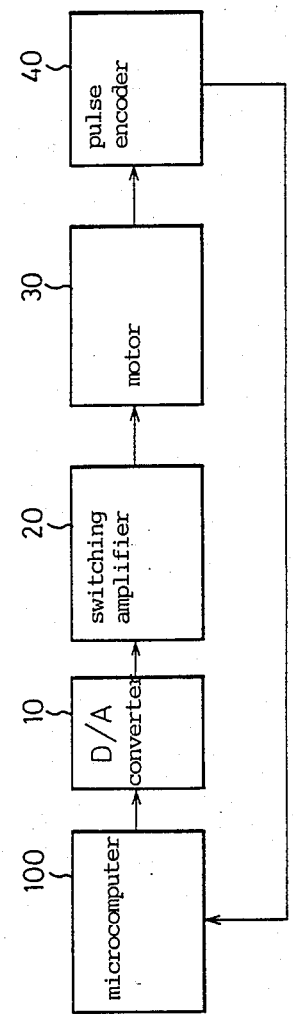

DIGITAL SERVO SYSTEM

DESCRIPTION

1. Field of the Invention

The present invention relates to a digital servo system, more particularly, to a digital servo system able to control the position of a object having a small friction resistance to motion.

2. Background of the Invention

FIG. 1 is a block diagram showing the main flows of control signals in a digital servo system using transfer functions. When the system receives a position command, using the feedback position (rotation angle of a motor) a deviation of the position from the position commanded is detected. The deviation of the position is amplified by a position angle $K_p$ and is output as a velocity command $V_{cmd}$. By comparing the velocity command with a feedback value of a velocity (an angular velocity of rotation in motor $\omega$), a deviation E is detected. The deviation E of the velocity is amplified and is output as a torque command $T_{cmd}$. If the torque command is greater than a load such as a friction resistance to motion, the motor can be driven.

The output of the torque command $T_{cmd}$ has a wave shape which corresponds approximately to a transfer function $K_1/s$ ($K_1$ is a integration constant for proportional integration) as shown in FIG. 2. The torque command has a integration wave shape having an inclination proportional to the deviation E, and increasing linearly, when the deviation obtained by subtracting the velocity feedback value from the velocity command $V_{cmd}$ is not zero, and even after the deviation E is made zero, the torque command maintains the value after the time the deviation E became zero. The torque command as mentioned above is effective in a system where an object having a great friction resistance to motion is driven because the torque increases until the torque overcomes the friction resistance.

But, if an object having a small friction resistance is driven by the torque command as mentioned above, once a velocity command is output the torque command increases linearly, and even after the difference between the velocity command and the velocity feedback value became zero, the torque command does not decrease and a high value torque command is maintained, therefore, the object continues to move as before to go beyond the target position. Next, the velocity of the position beyond the target position is detected, this results in a torque command in the opposite direction to the preceding torque command. Due to the torque command in the opposite direction, the object moves to the opposite direction, then passes over the target position again. Subsequently, similar operations are repeated, i.e., the object vibrates around the target position at which the object should stop.

SUMMARY OF THE INVENTION

An object of the present invention is to provide a digital servo system which can stop a moving object, having a small friction resistance to motion, at a position where the object should stop, immediately and without vibration.

A digital servo system according to the present invention comprises a position detecting device which detects an actual position of a object; a position deviation detecting device which detects and outputs a deviation of the actual position of the object from a predetermined position by a command; a velocity command generating device which outputs a velocity command to move the object according to the output of the position deviation detecting means; a velocity detecting means which detects an actual velocity of the object; a velocity deviation detecting means which detects and outputs a deviation of the actual velocity of the object from the velocity command; a torque command generating means which outputs a torque command to drive a motor according to the output of the velocity deviation detecting means; and a motor driving means which moves the object according to the torque command: in which the torque command increases according to the output of the velocity deviation detecting means up to a predetermined saturation value, and decreases swiftly to zero at the time that the output of the velocity deviation detecting means becomes zero.

BRIEF DESCRIPTION OF THE DRAWING

FIG. 2 shows torque commands comparing a conventional command and a command according to the present invention;

FIG. 3 shows the basic construction of a digital servo system according to the present invention;

FIG. 4 shows a hardware construction of a digital servo system as an embodiment of the present invention;

DESCRIPTION OF THE PREFERRED EMBODIMENT

Figure 1:
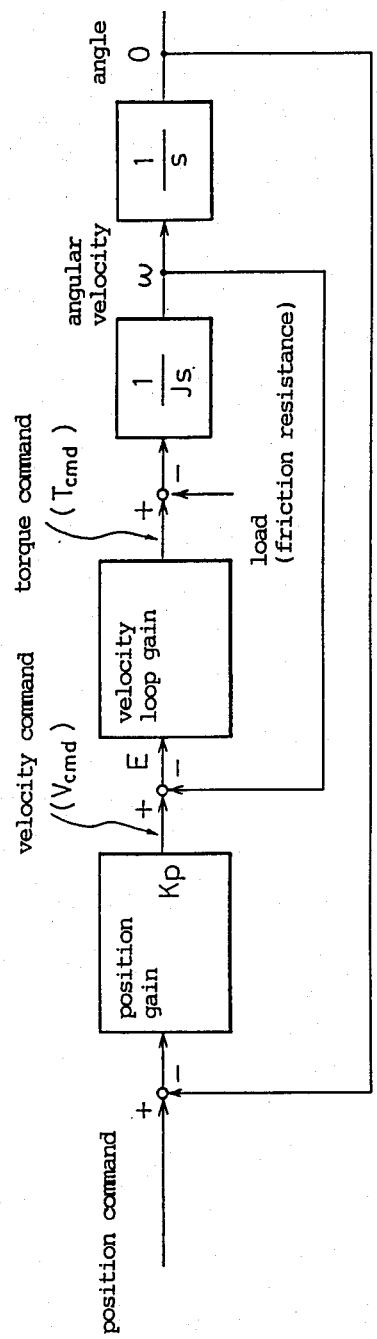
FIG. 1 is a block diagram showing the main flows of control signals in a digital servo system using transfer functions.

FIG. 3 shows a construction of the digital servo system according to the present invention; wherein a position detecting means, which detects an actual position of a object, is labeled 1; a position deviation detecting means, which detects and outputs a deviation of the actual position of the object from a predetermined position by a command, is labeled 2; a velocity command generating means, which outputs a velocity command to move the object according to the output of the position deviation detecting means, is labeled 3; a velocity detecting means, which detects an actual velocity of the object, is labeled 4; a velocity deviation detecting means, which detects and outputs a deviation of the actual velocity of the object from the velocity command, is labeled 5; a torque command generating means, which outputs a torque command to drive a motor according to the output of the velocity deviation detecting means is labeled 6; and a motor driving means, which moves the object according to the torque command, is labeled 7.

In the above construction, according to the present invention, the torque command $T_{cmd}$ from the torque command generating means 6 increases according to the output of the velocity deviation detecting means, up to a predetermined saturated value, and decreases swiftly to zero at the time that the output of the velocity deviation detecting means becomes zero. Therefore, in a short time the moving object is made to stop by the friction resistance force, and does not vibratingly repeatedly pass over the target position.

FIG. 4 shows a hardware construction of a digital servo system as an embodiment of the present invention. The construction of the FIG. 4 comprises an microcomputer 100, a D/A converter 10, a switching amplifier 20, a motor 30, and a pulse encoder 40.

The pulse encoder 40 in FIG. 4, together with a counter function which is included in the functions of the microcomputer 100, realizes the position detecting means 1 and the velocity detecting means 4 in FIG. 3, wherein in the counter function which realizes the velocity detecting means 4, velocity information is obtained by counting the outputs of the pulse encoder for each clock cycle time. The motor driving means 7 in FIG. 3, is realized by the D/A converter 10 which converts digital torque command values to analog values, and the switching amplifier 20 which supplies a driving current to the motor according to the torque command, in FIG. 4. All the means in FIG. 3 except the above components of the motor driving means are numerical processing means realized by the microcomputer 100.

The torque command is explained here as a characteristic of the present invention. FIG. 2 shows an example of the waveform of the torque command in an embodiment of the present invention, together with the waveform of a conventional torque command.

The torque command in an embodiment of the present invention is defined using a series:

$$T_{cmd\ 0},\ T_{cmd\ 1},\ \ldots\ T_{cmd\ n},\ T_{cmd\ n+1},\ \ldots$$

The initial value of the torque command $T_{cmd}$ equals $T_{cmd\ 0}=0$, i.e., when expressing the torque command value $T_{cmd}(t)$ as a function of the time t, $T_{cmd}(0)=T_{cmd\ 0}=0$.

The torque command value $T_{cmd}(t)$ is renewed at each clock cycle, i.e., when the clock cycle time is denoted by $\tau$, $T_{cmd}(t)$ is renewed from $T_{cmd\ 0}$ to $T_{cmd\ 1}$ at the time $t=\tau$; from $T_{cmd\ 1}$ to $T_{cmd\ 2}$ at the time $t=2\tau$; ... from $T_{cmd\ n-1}$ to $T_{cmd\ n}$ at the time $t=n\tau$; ....

The relationships between the values $T_{cmd\ 0}$, $T_{cmd\ 1}$, . . $T_{cmd\ n}$ . . . , are defined by the following recurrence formula $$T_{cmd\ n} = r\ \{T_{cmd\ n-1} + K_1\ E_n\},$$

wherein n=1, 2, ..., r is a constant satisfying $0<r<1$, $K_1$ is a constant which determines a gain, and $E_n$ is a value of the aforementioned deviation E at the time $t=n\tau$.

The torque command shown in the above series, increases as shown in FIG. 2, then saturates at a convergent value of the series $r\ K_1\ E/(1-r)$, and stays at a constant. Next when E becomes zero, the series $T_{cmd\ n}$ decreases at the rate of 1/r, and approaches zero. Then, when the torque value becomes equal to the friction resistance force of the moving object, the object is stopped.

As mentioned above, the torque command in the present invention still has the advantage of the conventional torque command, that the torque command value first increases simply, and the torque command in the present invention also has a advantage that the torque command value does not increase abnormally because it has a saturation value, and that when the deviation of the actual velocity from the velocity command value becomes zero, the torque command value begins to decrease, then the moving object is stopped by the friction resistance force of the moving object. Therefore, the moving object does not go far beyond the position where the moving object should stop, or vibrate around that position.

The digital servo system according to the present invention is particularly, useful in a system wherein the position of a object having a small friction resistance is controlled by a motor, for example, NC machine tools.

We claim:

1. A digital servo system comprising:
a position detecting means for detecting an actual position of an object;
a position deviation detecting means for detecting and for outputting a deviation of the actual position of the object from a predetermined position by a command;
a velocity command generating means for outputting a velocity command to move the object according to the output of the position deviation detecting means;
a velocity detecting means for detecting an actual velocity of the object;
a velocity deviation detecting means for detecting and for outputting a deviation of the actual velocity of the object from the velocity command;
a torque command generating means for outputting a torque command to drive a motor according to the output of the velocity deviation detecting means wherein the torque command increases according to a non-zero output of the velocity deviation detecting means up to a predetermined saturation value, and the torque command decreases swiftly down to zero at the time that the output of the velocity deviation detecting means becomes zero; and
a motor driving means for moving the object according to the torque command.

2. A digital servo system according to claim 1 wherein n=1, 2 ..., $T_{cmd}(t)$ is a torque command value at a time t which is output from said torque command generating means, E(t) is an output of said velocity deviation detecting means at the time t, $K_1$ is a gain constant, r is a constant which satisfies $0<r<1$; $\tau$ is a clock cycle time, and $E_n$ is the value of E(t) at the time $t=n\tau$; said torque command $T_{cmd}(t)$ is renewed to $T_{cmd\ n}$ at the time $t=n\tau$, where $$T_{cmd\ n} = r\ \{T_{cmd\ n-1} + K_1 n\},$$

and $T_{cmd}(0)=T_{cmd\ 0}=0$.

* * * * *